United States Patent
Hou et al.

(10) Patent No.: US 11,325,493 B2
(45) Date of Patent: May 10, 2022

(54) METHODS AND SYSTEMS FOR VARIABLE MAXIMUM CURRENT PROTECTION FOR BATTERY SYSTEMS

(71) Applicant: CHONGQING JINKANG POWERTRAIN NEW ENERGY CO., LTD., Chongqing (CN)

(72) Inventors: Jun Hou, Santa Clara, CA (US); Min Tian, Santa Clara, CA (US); Chen-Yen Yu, Santa Clara, CA (US); Minghao Dai, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 580 days.

(21) Appl. No.: 16/357,253

(22) Filed: Mar. 18, 2019

(65) Prior Publication Data
US 2020/0298723 A1    Sep. 24, 2020

(51) Int. Cl.
*B60L 58/18*    (2019.01)
*B60L 1/00*    (2006.01)
(Continued)

(52) U.S. Cl.
CPC ............... *B60L 58/10* (2019.02); *B60L 1/00* (2013.01); *H02J 7/0026* (2013.01)

(58) Field of Classification Search
CPC ............ B60L 58/10; B60L 1/00; H02J 7/0026
See application file for complete search history.

(56) References Cited

U.S. PATENT DOCUMENTS

| 5,495,503 A * | 2/1996 | King .................... B60L 58/10 375/257 |
| 10,011,185 B2 | 7/2018 | Trinkert et al. |
(Continued)

FOREIGN PATENT DOCUMENTS

| CN | 102064571 A | 5/2011 |
| CN | 102361331 A | 2/2012 |
(Continued)

OTHER PUBLICATIONS

International Search Report and Written Opinion dated Jul. 17, 2020 in related application No. PCT/US2020/023340, all pgs.
(Continued)

*Primary Examiner* — Mathew Franklin Gordon
(74) *Attorney, Agent, or Firm* — Cooper Legal Group, LLC

(57) ABSTRACT

Various systems and methods for controlling a maximum current threshold of a battery system within a vehicle are presented. The systems may include a battery module, one or more vehicle systems, a battery management system having a battery monitoring unit that monitors a current parameter, and a battery control system that receives the current parameter from the battery monitoring unit. The battery control system may be configured to identify a current event for the battery module, determine a duration of the current event, compare the duration of the current event to a plurality of time thresholds, determine the current parameter based on the duration of the current event, determine a maximum current parameter based on the duration of the current event and the current parameter, and control the one or more vehicle systems such that a current of the one or more batteries does not exceed the maximum current parameter.

16 Claims, 4 Drawing Sheets

(51) Int. Cl.
*B60L 3/04* (2006.01)
*B60L 58/10* (2019.01)
*H02J 7/00* (2006.01)

(56) References Cited

U.S. PATENT DOCUMENTS

| | | | | |
|---|---|---|---|---|
| 2014/0078863 | A1* | 3/2014 | Baym | G01V 1/306 |
| | | | | 367/49 |
| 2016/0190833 | A1 | 6/2016 | Roumi et al. | |
| 2017/0108552 | A1 | 4/2017 | Roumi et al. | |
| 2018/0345798 | A1* | 12/2018 | Sakakibara | B60L 1/02 |
| 2019/0081593 | A1 | 3/2019 | Paek et al. | |

FOREIGN PATENT DOCUMENTS

| | | |
|---|---|---|
| CN | 102457082 A | 5/2012 |
| CN | 105552465 A | 5/2016 |
| JP | 6458763 B2 | 1/2019 |

OTHER PUBLICATIONS

First Office Action and English Translation cited in CN111516550A dated May 21, 2021, 8 pages.

* cited by examiner

METHODS AND SYSTEMS FOR VARIABLE MAXIMUM CURRENT PROTECTION FOR BATTERY SYSTEMS

BACKGROUND

As battery technology has become more advanced, so have the use of batteries within electric vehicles (EV). In some instances, such as commuter vehicles, EVs aim to replace traditional gas-combustion vehicles as EVs offer a more environmental friendly solution. However, for EVs to eventually replace gas-combustion vehicles, EVs must be able to operate comparably and safely. One possible drawback of EVs is battery safety. Battery operations, such as charging and discharging processes, may be limited for battery safety. However, limiting batteries to avoid overcurrent or undercurrent may impact the available current for an EV, which in turn may affect operability of the EV. Hence, limiting batteries during charging and discharging events may be important for EVs. Therefore, there is a need for improved limiting and controlling of battery charge and discharge currents for batteries within EVs.

SUMMARY

Various embodiments are described related to a system for controlling a maximum current threshold of a battery system within a vehicle. The system for controlling a maximum current threshold for a battery system may include one or more vehicle systems, a battery module having one or more batteries, and a battery management system having a battery monitoring unit that monitors a current parameter of the battery module. The system for controlling a maximum current threshold may also include a battery control system, having one or more processors, that may receive the current parameter from the battery monitoring unit. The battery control system may be configured to identify a current event for the battery module, determine a duration of the current event, and compare the duration of the current event to a plurality of time thresholds. The battery control system may also be configured to determine the current parameter based on the duration of the current event, determine a maximum current parameter based on the duration of the current event and the current parameter, and control the one or more vehicle systems such that a current of the one or more batteries does not exceed the maximum current parameter. In embodiments, the battery control system may be further configured to compare the maximum current parameter to a previous maximum current, determine a current transition based on the maximum current parameter and the previous maximum current parameter, and control the one or more vehicle systems based on the current transition. For example, the battery control system may control the one or more vehicle systems such to vary the current of the one or more batteries based on the current transition.

Optionally, comparing the duration of the current event to the plurality of time thresholds may include comparing the duration of the current event to a short-pulse threshold and a long-pulse threshold to determine a first result. In some embodiments, the first result may indicate that the duration of the current event is less than the long-pulse threshold. Based on the first result the battery control system may be configured to calculate a current Root-Mean-Square (RMS)-value based on the current parameter, compare the current RMS-value to a long-pulse RMS-value to determine a second result, and determine based on the second result the maximum current parameter based on either a short-pulse parameter or a current transition between the short-pulse parameter and a long-pulse parameter. In other embodiments, the first result may indicate that the duration of the current event is greater than the long-pulse threshold. Based on the first result the battery control system may be configured to calculate a current RMS-value based on the current parameter, compare the current RMS-value to a long-pulse RMS-value and a continuous RMS-value to determine a third result, and determine based on the third result the maximum current parameter based on at least one of a short-pulse parameter, long-pulse parameter, or a continuous parameter.

A method for controlling current of a battery management system is also described herein. The method for controlling current of a battery management system may include identifying a current event for a battery module having one or more batteries, determining a duration of the current event, comparing the duration of the current event to a plurality of time thresholds, measuring a current parameter based on the duration of the current event, determining a maximum current parameter based on the duration of the current event and the current parameter, and controlling vehicle systems such that a current of the one or more batteries does not exceed the maximum current parameter. The method may also include comparing the maximum current parameter to a previous maximum current parameter and determining a current transition based on the maximum current parameter and the previous maximum current parameter. In embodiments, comparing the duration of the current event to the plurality of time thresholds may include comparing the duration of the current event to a short-pulse threshold and a long-pulse threshold to determine a first result. The first result may indicate that the duration of the current event is less than the short-pulse threshold. Based on the first result, the method for controlling current of the battery management system may determine the maximum current parameter based on a short-pulse parameter. Optionally, determining the maximum current parameter may be further based on one or more condition factors including a temperature and a state-of-charge for each of the one or more batteries.

In some embodiments, the first result may indicate that the duration of the current event is less than the long-pulse threshold. In such embodiments, based on the first result the method may include calculating a current Root-Mean-Square (RMS)-value based on the current parameter, comparing the current RMS-value to a long-pulse RMS-value to determine a second result, and determining based on the second result the maximum current parameter based on either a short-pulse parameter or a current transition between the short-pulse parameter and a long-pulse parameter. In other embodiments, the first result may indicate that the duration of the current event is greater than the long-pulse threshold. In such embodiments, based on the first result the method may include calculating a current RMS-value based on the current parameter, comparing the current RMS-value to a long-pulse RMS-value and a continuous RMS-value, and determining a third result. The third result may indicate that the current RMS-value is greater than the continuous RMS-value. In some embodiments, based on the third result the method may include determining the maximum current parameter based on a continuous parameter. In other embodiments, the third result may indicate that the current RMS-value is greater than the long-pulse RMS-value. In such embodiments, based on the third result the method may include determining the maximum current parameter based on a long-pulse parameter. While in still other embodiments, the third result may indicate that the current RMS-value is less than the long-pulse RMS-value. In such embodiments, based on the third result, the method may include determining the maximum current parameter based on a short-pulse parameter.

A non-transitory processor-readable medium for determining a maximum current parameter for a battery module including processor-readable instructions is also described herein. The processor-readable instructions may be configured to cause one or more processors to identify a current event for a battery module including one or more batteries, determine a duration of the current event, compare the duration of the current event to a plurality of time thresholds, determine the current parameter based on the duration of the current event, determine a maximum current parameter based on the duration of the current event and the current parameter, and control one or more vehicle systems such that a current of the one or more batteries does not exceed the maximum current parameter. In some embodiments, the maximum current parameter may be determined based on at least one of a short-pulse parameter, a long-pulse parameter, or a continuous parameter. In other embodiments, the processor-readable instructions may be further configured to cause the one or more processors to compare the maximum current parameter to a previous maximum current parameter, determine a current transition based on the maximum current parameter and the previous maximum current parameter, and control the one or more vehicle systems such to vary the current of the one or more batteries based on the current transition.

DETAILED DESCRIPTION

Figure 1:
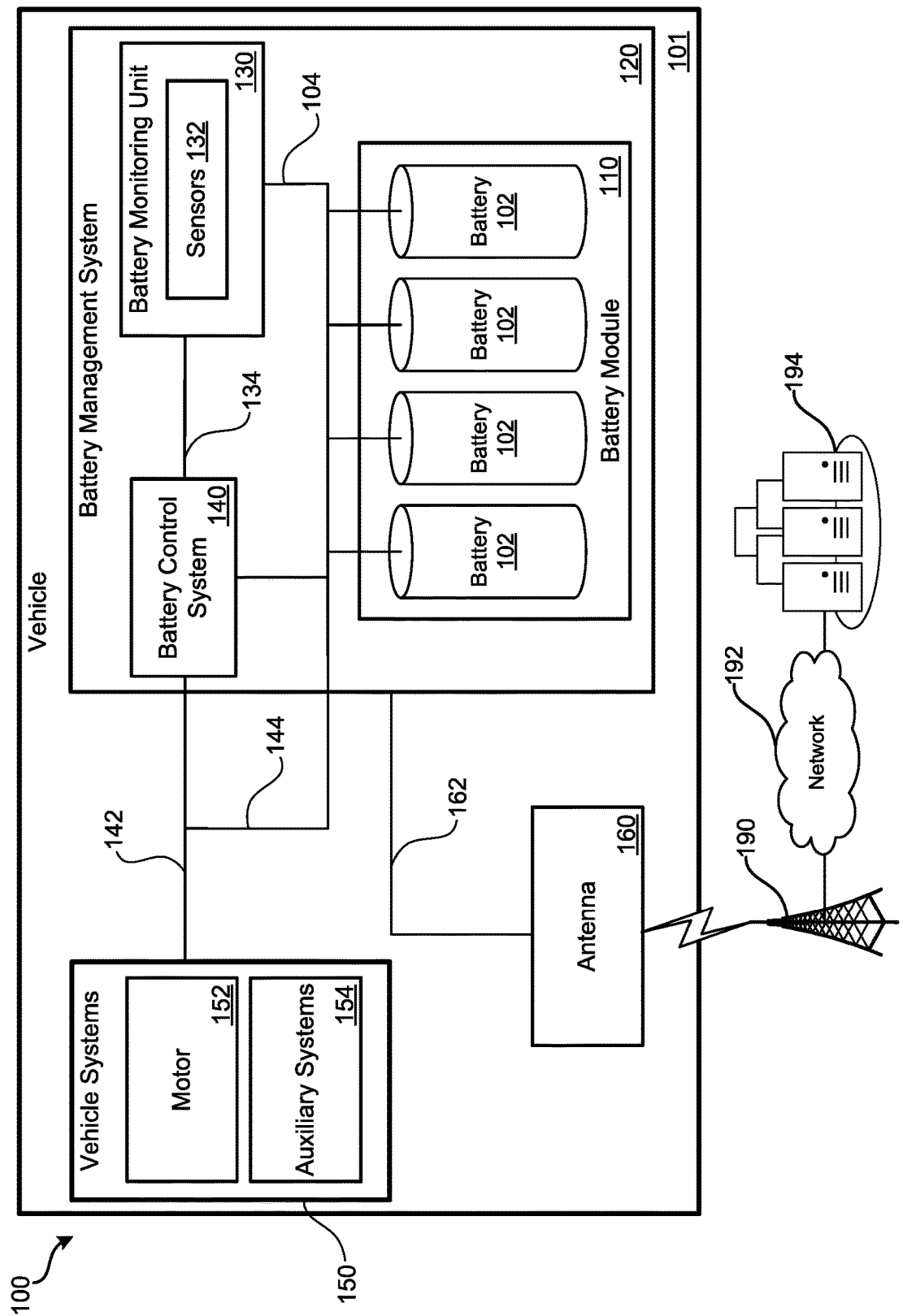
FIG. 1 illustrates a block diagram of a battery system within a vehicle according to an embodiment as disclosed herein.

Batteries, especially lithium-ion batteries, may be damaged by a variety of conditions. Generally, batteries should avoid: overcharge, overdischarge, overtemperature, undertemperature, overvoltage, undervoltage, and overcurrent. For example, overcharging may cause overheating which can lead to explosion or flame. Overdischarging a battery below a certain threshold may permanently reduce the energy capacity of the battery. To prevent damage, a battery may be prescribed threshold limits for charging and discharging. These threshold limits may be set based on a duration of charging or discharging of the battery, a rate of charging or discharging, or other battery capacity factors. For example, a battery may have a short-pulse discharging threshold limit that sets the maximum amount of current that the battery can discharge over a short time period, such as five seconds. That is, the battery should not discharge more current than the short-pulse discharging threshold limit when discharging for five or less seconds. These threshold limits are generally constant numbers that do not consider the battery system's operation dynamics or conditions. Because the battery system's operation dynamics may impact the operation of the batteries, such as for example, the available capacity of the batteries, limiting the batteries without considering the operation dynamics may lend to inaccurate limitation of the battery system. Inaccurate limiting of a battery's operating dynamics may result in excessive limitation which may impact the operation of a device powered by the battery. For example, excessive limiting of a battery within an electric vehicle (EV) may dampen the acceleration ability of the EV.

Actual limitations of batteries may change depending on operation dynamics and conditions. Operation dynamics, such as the state of charge (SOC), temperature, and duration of operation may change the rate and capacity of the battery for charging and discharging. For example, in cooler temperatures batteries may have reduced energy capacity and reduced rates of charging or discharging. Switching between threshold limits may also be inefficient and problematic. Because threshold limits are constant values, switching between threshold limits may result in abrupt changes to a battery's availability for charging or discharging. For example, a battery operating for five seconds may be limited by a short-pulse discharging limit of 7 C-rate during those five seconds. Continued operation beyond the five seconds may change the threshold limit to a long-pulse discharging limit of 4 C-rate. The abrupt decrease in discharging threshold limit from 7 C-rate to 4 C-rate may abruptly reduce the battery's discharge current, impacting the device that is drawing the battery's current. In cases where the battery is part of an electric vehicle (EV), the abrupt change between threshold limits may impact the EV's operation, such as abruptly reducing acceleration or torque capacity.

To provide current protection for battery systems based on operation dynamics and conditions, threshold limits may be based on one or more batteries' dynamics and/or conditions. For example, threshold limits for a battery system may change based on duration of operation, temperature, and SOC for each battery within a battery system. Additionally, to minimize abrupt changes in battery charging and discharging rates and energy capacities, threshold limits may transition dynamically. That is, instead of switching from a short-pulse threshold limit to a long-pulse threshold limit based on the duration of battery operation, the threshold limit may transition from the short-pulse threshold limit to the long-pulse threshold limit over a time period, providing for minimal impact to any device operating off of the battery system.

Further detail regarding such embodiments and additional embodiments is provided in relation to the figures. FIG. 1 illustrates a block diagram of battery system 120 within electric vehicle system 100. The systems and methods detailed herein may be used within an electric vehicle, such as vehicle 101. An electric vehicle may operate fully or partially on a battery system, such as battery system 120. In some embodiments, battery system 120 may be a battery management system. In other embodiments, battery system 120 may be a vehicle control unit (VCU). While in still other embodiments, battery system 120 may be an independent system that is not part of vehicle system 100. Battery system 120 may be any electronic system that manages the charging and discharging of a battery system to protect the batteries from operating outside of safe operating conditions. Battery system 120 may include battery module 110, battery monitoring unit 130, and battery control system 140. Electric vehicle system 100 may include vehicle 101, battery system 120, vehicle systems 150, antenna 160, cellular network 190, network 192, and cloud-based server system 194.

Vehicle 101 may refer to various forms of vehicles that may be operated by an onboard battery system, such as battery system 120. Vehicle 101 may be a passenger car, pickup truck, sport utility vehicle, truck, motorized cart, all-terrain vehicle, motorcycle, powered scooter, or some other form of powered vehicle. Such a vehicle may be configured to be powered partially or fully by battery system 120. Auxiliary power may be supplied by a combustion-based system. Therefore, at least some of vehicle 101 may be powered by electrical current. Vehicle 101 may include vehicle systems 150. Vehicle systems 150 may include motor 152 and auxiliary systems 154. Auxiliary systems 154 may include a vehicle steering system, an acceleration and braking system, and other onboard electrical systems. Each of these systems may be, at least at times, powered by battery system 120. Other vehicle systems may also be present that may be, at least some of the time, powered by battery system 120, such as a signaling system that indicates turns and lane changes, and a lighting system to illuminate a roadway or an interior of vehicle 101.

Battery system 120 may include various sensors and computerized components that execute or function as various components detailed in FIG. 1. Such sensors and components may include: battery control system 140, battery monitoring unit 130, and battery module 110. Battery module 110 may include at least one battery 102. In embodiments, a plurality of batteries 102 may be present. Additionally, more than one battery module 110 may be present within battery system 120. Battery monitoring unit 130 may monitor each of battery 102 within battery module 110 or battery monitoring unit 130 may monitor battery module 110. As part of battery monitoring unit 130, sensors 132 may be present. Sensors 132 may include a temperature sensor, a capacity sensor, a voltage sensor, and other sensors of the like for each of batteries 102 within battery module 110. A state of charge (SOC) may be estimated based on the information provided by the sensors 132. In embodiments, sensors 132 may include sensors specific to battery module 110, for example, to determine the capacity of battery module 110 as a whole. Operating conditions of the battery module 110 as a whole may also be calculated from the individual data collected for each of batteries 102 by battery monitoring unit 130.

Battery monitoring unit 130 may be in communication with batteries 102, and thereby in communication with battery module 110, by communication line 104. Battery monitoring unit 130 may transmit the collected data from sensors 132 to battery control system 140 via communication line 134. Battery control system 140 may further receive and transmit data from vehicle systems 150 and antenna 160. In embodiments, battery control system 140 may be part of a battery management system or a vehicle control unit (VCU). Battery control system 140 may access one or more databases or data stores of data that are stored locally as part of battery system 120 or electric vehicle system 100, using one or more non-transitory processor-readable mediums, which can include memories, hard drives, and solid-state drives. Battery system 120 may include various computerized components, such as one or more processors and communication busses. The one or more processors used as part of battery system 120 may include one or more specific-purpose processors that have various functionality hard-coded as part of the one or more processors, such as an application-specific integrated circuit (ASIC). Additionally, or alternatively, one or more general-purpose processors may be used, as part of battery system 120, that execute stored instructions that cause the general-purpose processors to perform specific-purpose functions. Therefore, software and/or firmware may be used to perform at least some of the functions of battery system 120. Further details regarding the functioning of battery system 120 is provided in relation to FIG. 2, FIG. 3, and FIG. 4.

Battery system 120 may be in communication with vehicle systems 150 via communication line 142. In embodiments, a vehicle control interface (not shown) may be present to facilitate communication between vehicle systems 150 and battery system 120. For example, a vehicle control interface may translate instructions or signals from battery system 120 to control motor 152 or auxiliary systems 154. Feedback from vehicle systems 150 (e.g., vehicle acceleration, braking, engine status) may be provided by the vehicle control interface to battery system 120. Battery control system 140 may also be in communication with batteries 102, and thereby in communication with battery module 110, via line 114. Battery control system 140 may control the current charge and discharge of batteries 102 to and from vehicle systems 150. For example, vehicle systems 150 may indicate to battery control system 140 that vehicle 101 is accelerating and requires power (e.g., current) from batteries 102. Battery control system 140 may then control the discharge of batteries 102 to provide the requested power to vehicle systems 150. Current from batteries 102 may be transmitted from battery module 110 to vehicle systems 150 via line 144. However, to ensure that batteries 102 do not overdischarge, battery control system 140 may limit the maximum amount of discharge for batteries 102 based on data received from battery monitoring unit 130. In this manner, battery control system 140 may control the power requirements of vehicle systems 150 based on the available power and maximum current limits of batteries 102. In embodiments, battery system 120 may control one or more vehicle systems 150 based on the maximum current limits of batteries 102.

In embodiments, a network interface may also be present to facility communication between battery system 120 and various external sources. For example, a network interface may use antenna 160 to wirelessly communication with cellular network 190, which may be a 3G, 4G, 5G, or some other form of wireless cellular network. Cellular network 190 may use one or more networks 192, which can include the Internet, to communicate with a remote cloud-based server system 194. Cloud-based server system 194 may be operated by an entity that provides data to and receives data from battery system 120. For instance, cloud-based server system 194 may be operated by (or have operated on its behalf) a manufacturer or provider of battery system 120 or electric vehicle system 100. Therefore, cloud-based server system 194 may be able communicate with a large number (e.g., thousands) of battery systems 120 deployed in geographically-scattered vehicles. In some embodiments, cloud-based server system 194 may operate to store collected data from battery system 120. For example, cloud-based server system 194 may store data collected from battery system 120 on past operation dynamics for batteries 102, such as past recorded current parameters. Antenna 160 may also be able to communicate with other forms of wireless networks. For instance, antenna 160 may be used to communicate with a wireless local area network (WLAN), such as a Wi-Fi network to which battery system 120 has permission to access. For example, when parked at a home, vehicle 101 may be within range of a vehicle owner's Wi-Fi network, through which the Internet and cloud-based server system 194 may be accessed. Other forms of network-based communication with cloud-based server system 194 are possible, such as a Bluetooth communication link via a vehicle occupant's mobile device to a cellular network or WLAN.

Figure 2:
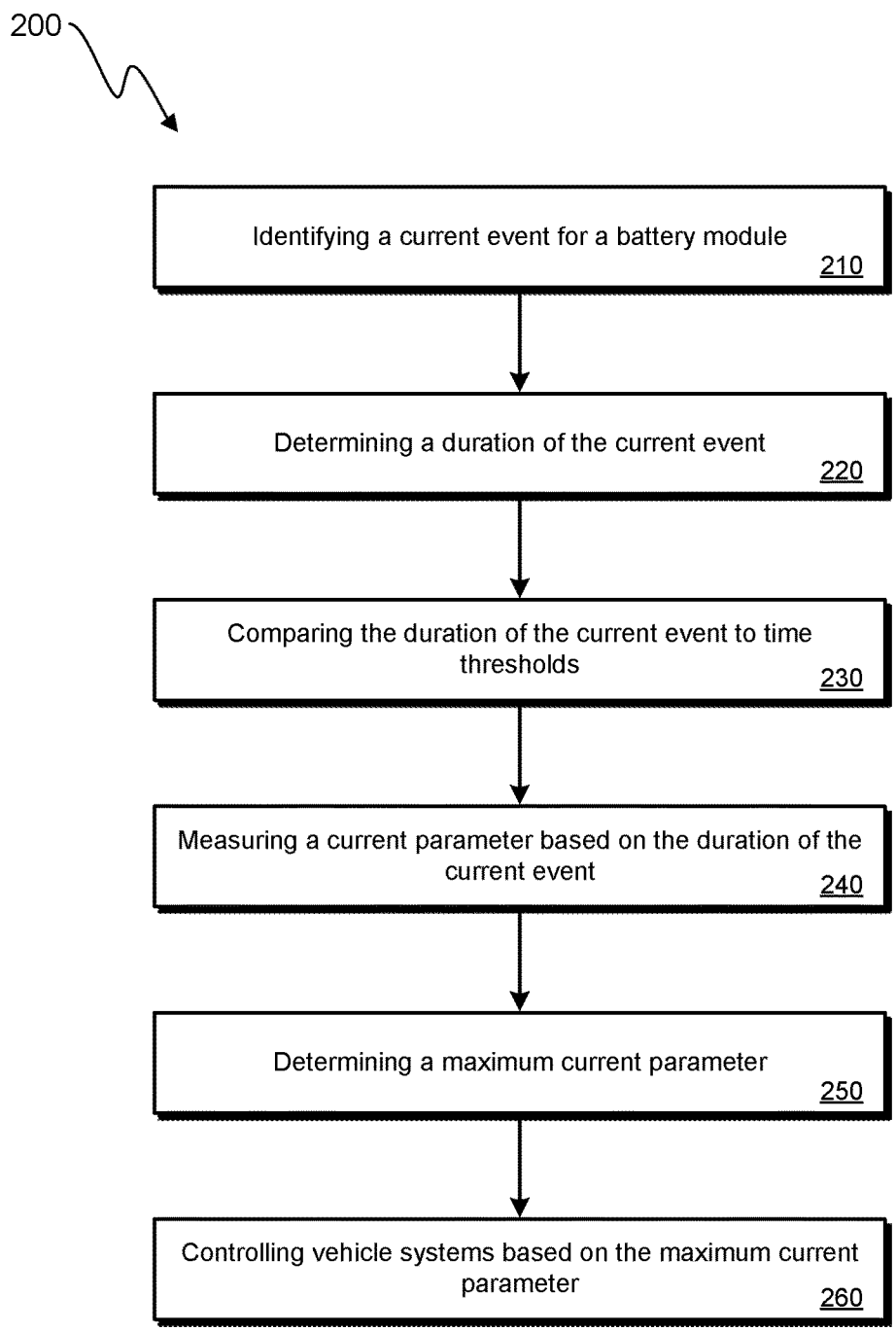
FIG. 2 illustrates a method for controlling a maximum current threshold of a battery system within a vehicle according to an embodiment as disclosed herein.

FIG. 2 illustrates am embodiment of method 200 for controlling a maximum current threshold of a battery system within a vehicle. Method 200 may be performed by battery system 120 of electric vehicle system 100 of FIG. 1. For example, battery system 120 may be installed on a vehicle and battery system 120 may be configured to control the vehicle based on method 200. In some embodiments, method 200 may be performed using an alternative system or device that performs all the functions of battery system 120. In other embodiments, method 200 may be performed using an alternative system or device that directs battery system 120 to operate based on method 200.

At block 210, a current event for a battery module may be identified. The battery module may include one or more batteries, such as battery module 110 including batteries 102. A current event for a battery module may include any initiation of battery operations. For example, any initiation of current, such as a charging or a discharging process for one or more batteries, within the battery module may be a current event. In embodiments, starting the vehicle may be a current event, while in other embodiments, starting any of the vehicle systems that draw power from the battery module containing the one or more batteries may be a current event.

At block 220, a duration of the current event may be determined. Once a current event is identified at block 210, a timer may begin to count the duration of the current event. For example, at the time the current event begins, the time may be zero, but as the current event continues, the timer may continue to count. The timer may continue to count the duration of the current event until the current event ends. The current event may end when current to or from the batteries, such as a during charging or a discharging process for the one or more batteries, ceases. For example, a timer may begin counting when an EV is started, and an onboard battery management system starts. The time may stop counting when the EV is turned off, along with the onboard battery management system.

At block 230, the duration of the current event determined at block 220 may be compared to one or more time thresholds to determine a first result. Time thresholds may include a short-pulse threshold and a long-pulse threshold. In embodiments, there may be more time thresholds. The short-pulse threshold may be less than the long-pulse threshold. For example, the short-pulse threshold may be five seconds and the long-pulse threshold may be 30 seconds. The short-pulse threshold may correspond to a short duration of a current event, such as a battery operating for five or less seconds. The long-pulse threshold may correspond to a longer duration of a current event, such as a battery operating between 5 and 30 seconds. And a duration of a current event lasting longer than 30 seconds may correspond to a continuous event. The actual time amounts corresponding to each of the time thresholds may vary depending on the batteries used within the battery system, the type and application of the vehicle, and operating conditions of the batteries and/or the vehicle. For example, the short-pulse threshold may range from 1 to 5 seconds, 5 to 10 seconds, 10 to 20 seconds, 20 to 30 seconds, 30 to 40 seconds, 40 to 50 seconds, 50 to 60 seconds, or greater than 60 seconds. The long-pulse threshold may range from 5 to 15 seconds, 15 to 30 seconds, 30 to 45 seconds, 45 to 60 seconds, 60 to 75 seconds, 75 to 90 seconds, or greater than 90 seconds. As discussed in greater detail below, the short-pulse threshold may correspond to a larger maximum current threshold for the batteries because, in part, of the short duration of battery operation. Whereas, the long-pulse threshold may correspond to smaller maximum current thresholds for the batteries because, in part, of the longer duration of battery operation. That is, the longer the batteries, the lower the maximum current threshold may be for the batteries.

A first result may be determined by comparing the duration of the current event to one or more of the time thresholds. For example, the first result may be determined by comparing the duration of the current event to a short-pulse threshold and a long-pulse threshold. In various embodiments, the first result may be determined by comparing the duration of the current event to other time thresholds, such as an intermediate threshold. The first result may indicate that the duration of the current event is greater or less than the compared time threshold(s). The comparison to each of the time thresholds may be done sequentially or in simultaneously. In embodiments, the duration of the current event may first be compared with the short-pulse threshold to determine whether the duration of the current event is greater than the short-pulse threshold. If the duration of the current event is greater than the short-pulse threshold, then the duration of the current event may be compared with the long-pulse threshold to determine whether the duration of the current event is greater than the long-pulse threshold.

At block 240, a current parameter may be measured based on the duration of the current event. After comparing the duration of the current event to the time thresholds to determine the first result, a current parameter may be measured based on the duration of the current event. For example, if the duration of the current event is 25 seconds, and the first result indicates that the duration of the current event is greater than a short-pulse threshold of five seconds, but less than a long-pulse threshold of 30 seconds, then a current parameter may be measured based on the 25 second duration of the current event. A current parameter may be measured for the battery module or for each of the individual batteries within the battery module. In embodiments, a battery monitoring unit, such as battery monitoring unit 130, may measure the current parameter. While in other embodiments, another system or device within the battery system may measure the current parameter. Current parameters that may be measured may include current (e.g., amps), a rate of current, a C-rate, voltage, resistance, energy capacity, potential, or the like. In embodiments, the current parameter may include SOC and/or the temperature of one or more batteries within the battery system.

At block 250, a maximum current parameter may be determined. The maximum current parameter may be determined based on one or more results determined by the battery system. In embodiments, the maximum current parameter may be determined based on the first result determined at block 230. For example, a first result may indicate that the duration of the current event is less than the short-pulse threshold. Then, based in part on this first result, a maximum current parameter may be determined based on a short-pulse parameter. In embodiments where the first result indicates that the duration of the current event is less than the short-pulse threshold, then there may be no block 240. That is, when the first result indicates that the duration of the current event is less than the short-pulse threshold, the maximum current parameter may be determined without measuring the current parameter based on the duration of the current event.

The maximum current parameter may be determined based on a short-pulse parameter, a long-pulse parameter, or a continuous parameter. In embodiments, the maximum current parameter determined may include a current transition. A current transition may include transitioning a maximum current parameter from a first maximum current parameter to a second maximum current parameter. For example, if the maximum current parameter is determined to be based on a current transition from a short-pulse parameter to a long-pulse parameter, than the determined maximum current parameter may transition from a maximum current parameter based on a short-pulse parameter to a maximum current parameter based on a long-pulse parameter. In embodiments, the current transition between the first maximum current parameter and the second maximum current parameter may be exponential, logarithmic, linear, proportional, or any other mathematical correlation that allows for a smooth transition between the two maximum current parameters. For example, if the first maximum current parameter is 5 C-rate and the second maximum current parameter is 3 C-rate, then a determined maximum current parameter may include an exponential transition from 5 C-rate to 3 C-rate.

The maximum current parameter may set a maximum limit for the battery module for the current parameter, such as a maximum charging or discharging rate for the battery module. For example, a determined maximum current parameter may set a maximum discharge limit of 5 C-rate for the battery module. This may mean that the battery module may not discharge more than 5 C-rate. The maximum current parameter may include current (e.g., amps), a rate of current, a C-rate, voltage, resistance, energy capacity, potential, or the like. In embodiments, the maximum current parameter may also include SOC and/or a temperature of one or more batteries within the battery system. In embodiments, the maximum current parameter may be specific to each individual battery within the battery module or may be specific to the battery module. Similarly, the short-pulse parameters and the long-pulse parameters may include current (e.g., amps), a rate of current, a C-rate, voltage, resistance, energy capacity, potential, or the like. And embodiments, the short-pulse parameters and the long-pulse parameters may include a SOC or a temperature for one or more batteries within the battery system.

At block 260, one or more vehicle systems may be controlled based on the maximum current parameter. As noted above, the determined maximum current parameter may set a maximum limit for a current parameter of the battery module or a battery within the battery module. The limit of the current parameter of the battery module (or battery) may impact the vehicle systems that derive power from the battery module. As such, the battery control system may control the vehicle systems such that the vehicle systems do not exceed the maximum current parameter for the battery module (or battery). For example, under acceleration a motor within an electric vehicle (EV) may request or draw more than 5 C-rate from the battery control system. However, the battery control system may determine a maximum current parameter of 5 C-rate for a battery module. To protect the battery module, the battery control system may control the motor such that the motor does not draw more than 5 C-rate from the battery module. In another example, energy generated by a braking system within an EV may be used to charge batteries within a battery module. However, the battery control system may determine that based on the temperature and state of charge (SOC) of the batteries, that there is limited capacity for charging. Accordingly, the battery control system may determine a maximum current parameter and may redirect any excess energy from the braking system that exceeds the maximum current parameter away from the battery module. Similarly, other vehicle systems may be controlled based on the maximum current parameter.

Figure 3:
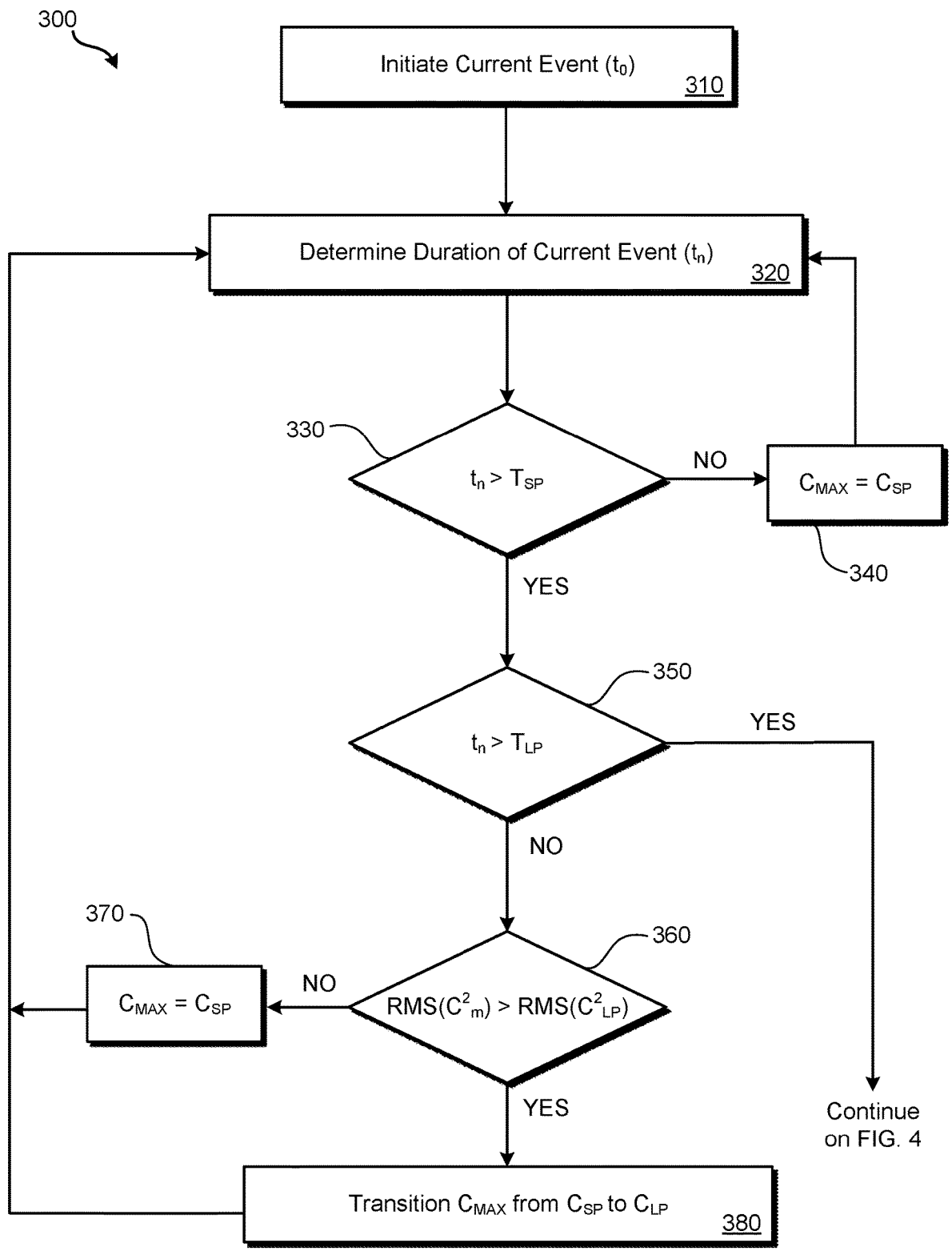
FIG. 3 illustrates a method for controlling a maximum current threshold of a battery system within a vehicle according to an embodiment as disclosed herein.

Starting at FIG. 3, method 300 for controlling a maximum current threshold of a battery system within a vehicle according to an embodiment is depicted. Starting at block 310, a current event may initiate. The initiation of the current event may begin a timer (or counter) to begin measuring a duration of the current event. In embodiments, the current event may initiate when a battery module, or a battery within the battery module, begins to operate. As used herein, any discussion related to a battery module may also correspond to a battery within the battery module. Operation of the battery module may include any change in current to or from the battery module, or any change in capacity of the battery module. Exemplary current events that may trigger the timer at block 310 include charging or discharging of the battery module or starting a device powered by the battery module, such as an EV. The initiation of the current event may be denoted as $t_0$ or $t=0$.

At block 320, a duration of the current event may be determined. As noted above, once a current event initiates, a time may being to count or measure the duration of the current event. The duration may be measured at a set frequency of time, n. For example, the set frequency may be 10 milliseconds, 100 milliseconds, 1 second, 5 seconds, 1 minute, or any other interval of time. In embodiments, 1 second intervals may correspond to 1 Hertz intervals for a battery module. The duration of the current event may be denoted as $t_n$ or $t=n$, with n being some frequency of time.

At block 330, a first result may be determined. The first result may be determined at block 330 and/or block 350. The first result may indicate whether a duration of a current event ($t_n$) is greater than a short-pulse threshold ($T_{SP}$) and whether the duration of the current event ($t_n$) is greater than a long-pulse threshold ($T_{LP}$). At block 330, the first result may indicate whether the duration of a current event ($t_n$) is greater than a short-pulse threshold ($T_{SP}$). A short-pulse threshold ($T_{SP}$) may be a time threshold that differentiates between a short-pulse time period and a long-pulse time period. That is, any duration of a current event that is less than the short-pulse threshold ($T_{SP}$) may correspond to short-pulse battery operations, while any duration of a current event that is greater than the short-pulse threshold ($T_{SP}$) may correspond to long-pulse battery operations. As a battery operates, the available current and capacity may reduce. Thus, the maximum operating limits for the battery may also change over time to reflect the battery's operational availability. In embodiments, the short-pulse threshold ($T_{SP}$) may range from 1 to 5 seconds, 5 to 10 seconds, 10 to 20 seconds, 20 to 30 seconds, 30 to 40 seconds, 40 to 50 seconds, 50 to 60 seconds, or greater than 60 seconds. Accordingly, any duration of the current event between the initiation of the current event ($t_0$) and the short-pulse threshold ($T_{SP}$) may be within a short-pulse time period. For example, if the short-pulse threshold ($T_{SP}$) is set at 5 seconds, any current event with a duration between the initiation of the current event ($t_0$) and 5 seconds ($t_5$) may be within the short-pulse time period.

At block 330, the first result may indicate that the duration of the current event ($t_n$) is greater the short-pulse threshold ($T_{SP}$). If the first result indicates that the duration of the current event ($t_n$) is greater than the short-pulse threshold ($T_{SP}$), then method 300 may follow the YES branch. But if the duration of the current event ($t_n$) is less than the short-pulse threshold ($T_{SP}$), then method 300 may follow the NO branch. In some embodiments, block 330 may include a determination of whether the duration of the current event ($t_n$) is less than or equal to the short-pulse threshold ($T_{SP}$). In other embodiments, block 330 may include a determination of whether the duration of the current event ($t_n$) is greater than or equal to the short-pulse threshold ($T_{SP}$). However, for ease of explanation, the following discussion may relate only to whether the duration of the current event ($t_n$) is greater than or less than the short-pulse threshold ($T_{SP}$).

At block 330, the first result may indicate that the duration of the current event ($t_n$) is less than the short-pulse threshold ($T_{SP}$). If the duration of the current event ($t_n$) is less than the short-pulse threshold ($T_{SP}$), then method 300 may include block 340. At block 340, a maximum current parameter ($C_{MAX}$), may be determined based on one or more short-pulse parameters ($C_{SP,n}$). In embodiments, short-pulse parameters ($C_{SP,n}$) may include current (e.g., amps), a rate of current, a C-Rate, voltage, resistance, energy capacity, potential, or the like. In other embodiments, short-pulse parameters ($C_{SP,n}$) may also include a SOC and/or a temperature for one or more batteries within the battery system. The maximum current parameter ($C_{MAX}$) may be a limit on battery operation or maximum threshold above which battery operation is limited or reduced. The maximum current parameter ($C_{MAX}$) may indicate a limit above which battery operation may be unsafe. As such, a battery system may control one or more systems powered by the battery based on the maximum current parameter ($C_{MAX}$) so that the battery does not exceed the maximum current parameter ($C_{MAX}$). For example, if a maximum current parameter ($C_{MAX}$) for a battery discharge event is determined to be 5 C-rate, then battery discharge above 5 C-rate may risk damage to the battery. To prevent damage, a battery system may limit or prevent the battery from operating in excess of the maximum current parameter ($C_{MAX}$). Thus, a motor of an EV powered by the battery may be controlled such that the motor does not draw or request more current than the maximum current parameter ($C_{MAX}$) from the battery or a battery module of which the battery is part of. The maximum current parameter ($C_{MAX}$) may correspond to a variety of battery operation conditions. For example, the maximum current parameter ($C_{MAX}$) may include current (e.g., amps), a rate of current, a C-Rate, voltage, resistance, energy capacity, potential, or the like. In other embodiments, the maximum current parameter ($C_{MAX}$) may also include a SOC and/or a temperature for one or more batteries within the battery system.

At block 340, the maximum current parameter ($C_{MAX}$) may be determined based on one or more short-pulse parameters ($C_{SP,n}$). A short-pulse parameter ($C_{SP,n}$) may correspond to one or more past-recorded current parameters recorded at a set frequency, n, when the duration of a current event was less than a short-pulse time threshold. That is, when a duration of battery module operation is less than a short-pulse threshold ($T_{SP}$), within a short-pulse time period, current parameters corresponding to the battery operation may be recorded. Current parameters ($C_m$) at each time frequency, n, may be recorded. For example, a current, a C-rate, temperature, and SOC, for the battery module may be recorded at each time frequency, n, when the duration of battery operation is below the short-pulse threshold ($T_{SP}$). In embodiments, one or more short-pulse parameters ($C_{SP,n}$) may include current parameters not based on the battery operation. For example, a short-pulse parameter ($C_{SP,n}$) may correspond to a battery manufacturer's recommendation for maximum current for battery operation within the short-pulse time period.

Short-pulse parameters ($C_{SP,n}$) may be stored on a short-pulse table. Corresponding battery operation data, such as C-rate, temperature, SOC, and duration, may also be stored on the short-pulse table. When method 300 determines that the maximum current parameter ($C_{MAX}$) is based on the short-pulse parameter ($C_{SP,n}$), then a short-pulse parameter ($C_{SP,n}$) corresponding to the battery module's operations may be identified. For example, if the battery module has a temperature of 65° F., a SOC of 85%, and has been operating for a duration of 4 seconds ($t_4$), then a short-pulse parameter ($C_{SP,4}$) on the short-pulse table corresponding to 4 second battery operation at a temperature of 65° F. with a SOC of 85% may be identified. In embodiments, if there is no short-pulse parameter ($C_{SP,n}$) for the exact battery operations on the short-pulse table, then a short-pulse parameter ($C_{SP,n}$) for correlating battery operations may be identified. For example, if the battery operations includes a temperature of 70° F. but on the short-pulse table there are only short-pulse parameters ($C_{SP,n}$) for 65° F. and 75° F., then extrapolation or interpolation methods may be used to determine a short-pulse parameter ($C_{SP,n}$). In some embodiments, only duration of the current event may be used to identify a short-pulse parameter ($C_{SP,n}$), while in others only the temperature or SOC may be used to identify the short-pulse parameter ($C_{SP,n}$). In this manner, the maximum current parameter determined by the battery control system may be based on actual and dynamic data corresponding to the battery module.

After block 340, method 300 may return to block 320 to determine a duration of the current event ($t_n$). Method 300 may continuously monitor the battery module to determine how much time has elapsed since initiation of the current event. Method 300 may continue to determine the duration of the current event ($t_n$) until the current event ceases. For example, a battery system may monitor a battery module at a set time frequency, n, such as 1 second, starting at a time an EV powered by the battery module starts until the EV is turned off. In this manner, method 300 may be a feedback and/or looped method, providing dynamic control of a battery module and corresponding device powered by the battery module (e.g., an EV).

At block 330, the first result may indicate that the duration of the current event ($t_n$) is greater than the short-pulse threshold ($T_{SP}$). If the duration of the current event ($t_n$) is greater than the short-pulse threshold ($T_{SP}$), then method 300 may continue via the YES branch to block 350. At block 350, the first result may indicate whether the duration of current event ($t_n$) is greater than a long-pulse threshold ($T_{LP}$). The first result may indicate that the duration of current event ($t_n$) is greater than a long-pulse threshold ($T_{LP}$) or the first result may indicate that the duration of the current event ($t_n$) is less than a long-pulse threshold ($T_{LP}$). In some embodiments, the first result may indicate whether the duration of the current event ($t_n$) is less than or equal to the long-pulse threshold ($T_{LP}$). In other embodiments, the first result may indicate whether the duration of the current event ($t_n$) is greater than or equal to the long-pulse threshold ($T_{LP}$). However, for ease of explanation, the following discussion may relate only to whether the duration of the current event ($t_n$) is greater than or less than the long-pulse threshold ($T_{LP}$).

A long-pulse threshold ($T_{LP}$) may be a time threshold that differentiates between a short-pulse time period and a long-pulse time period, and a long-pulse time period and a continuous time period. That is, any duration of a current event that is less than the long-pulse threshold ($T_{LP}$) may correspond to a long-pulse time period (e.g., long-pulse battery operations), while any duration of a current event that is greater than the long-pulse threshold ($T_{LP}$) may correspond to a continuous time period (e.g., continuous battery operations). As noted above, as a battery operates, the available current, capacity, and/or C-rate may reduce. This may be especially true for extended durations of battery operations, such as continuous battery operations. Accordingly, the maximum operating limits for a battery may change over time to reflect the battery's availability. In embodiments, the long-pulse threshold ($T_{LP}$) may range from 5 to 15 seconds, 15 to 30 seconds, 30 to 45 seconds, 45 to 60 seconds, 60 to 75 seconds, 75 to 90 seconds, or greater than 90 seconds. Any duration of the current event between a short-pulse threshold ($T_{SP}$) and the long-pulse threshold ($T_{LP}$) may be within a long-pulse time period. For example, if the short-pulse threshold ($T_{SP}$) is set at 5 seconds and the long-pulse threshold ($T_{LP}$) is set at 30 seconds, then any current event with a duration between 5 seconds and 30 seconds may be within the long-pulse time period.

At block 350, the first result may indicate whether the duration of the current event ($t_n$) is greater than the long-pulse threshold ($T_{LP}$). If the duration of the current event ($t_n$) is greater than the long-pulse threshold ($T_{LP}$), then method 300 may follow the YES branch. And if the duration of the current event ($t_n$) is less than the long-pulse threshold ($T_{LP}$), then method 300 may follow the NO branch. In embodiments, block 330 and block 350 may be the same block. In such embodiments, the first result may determine whether method 300 continues to block 340 or whether method 300 continues to block 360. For example, a first result at block 330 may indicate whether the duration of the current event ($t_n$) is greater than the short-pulse threshold ($T_{SP}$) and whether the duration of the current event ($t_n$) is greater than the long-pulse threshold ($T_{LP}$). In such an embodiment, if the first result indicates that the duration of the current event ($t_n$) is less than the short-pulse threshold ($T_{SP}$), then method 300 may continue at block 340. However, if the first result indicates that the duration of the current event ($t_n$) is greater than the short-pulse threshold ($T_{SP}$) but less than the long-pulse threshold ($T_{LP}$), then method 300 may continue at block 360. If the first result indicates that the duration of the current event ($t_n$) is greater than the long-pulse threshold ($T_{LP}$), then method 300 may continue at block 405 (on FIG. 4).

As illustrated on FIG. 3, if the first result indicates that the duration of current event ($t_n$) is less than long-pulse threshold ($T_{LP}$), then method 300 may continue via the NO branch to block 360. At block 360, a second result may be determined. The second result may indicate whether a current Root-Mean-Square (RMS)-value based on a current parameter ($C_m$) is greater than a long-pulse RMS-value. A current parameter ($C_m$) may be measured for the battery module or for each of the individual batteries within the battery module. In embodiments, a battery monitoring unit, such as battery monitoring unit 130, may measure the current parameter ($C_m$). While in other embodiments, another system or device within the battery system may measure the current parameter ($C_m$). Current parameters ($C_m$) that may be measured may include current (e.g., amps), a rate of current, a C-rate, voltage, resistance, energy capacity, potential, or the like. In embodiments, current parameters ($C_m$) may also include SOC and/or temperature of one or more batteries.

In embodiments, a battery system may measure a current parameter ($C_m$), such as current or C-rate, of a battery module at a time interval, m, during a battery operation. Hence, a current parameter may be denoted as $C_m$ with m being the time interval when the current parameter ($C_m$) was measured. For example, if the time interval is 10 seconds, then a current parameter ($C_{10}$) for the battery module may be measured based on the 10 second time interval. The time interval, m, of which the current parameters ($C_m$) are measured, may be based on an interval of time leading up to the duration of the current event ($t_n$), such as a portion of the duration of the current event ($t_{n-m}$) or the whole duration of the current event ($t_n$).

A current RMS-value based on a current parameter ($C_m$) may be the square root of the mean of a plurality of current parameters ($C_m$) measured at time interval, m. In embodiments, time interval, m, may correspond to the short-pulse threshold ($T_{SP}$) or the long-pulse threshold ($T_{LP}$), while in other embodiments, time interval, m, may correspond to the whole duration of the current event ($t_n$). For example, if the duration of the current event ($t_n$) is five seconds, then at $t_5$ a current parameter, $C_5$, may be measured. If the sample time is set to be 1 Hertz, then the time frequency may be set at 1 second intervals. Thus, at every second between $t_0$ and $t_5$, the battery system may measure a current parameter ($C_m$) for the battery module. Each current parameter taken at a different time interval may be designated by the time, n, at which it was taken. For example, $C_1$, $C_2$, $C_3$, $C_4$, and $C_5$. $C_1$ may correspond to the current parameter of the battery module measured at 1 second ($t_1$), $C_2$ may correspond to the current parameter of the battery module measured at 2 seconds ($t_2$), and so forth and so on.

As noted above, in embodiments, the interval of time, m, may relate to the short-pulse threshold ($T_{SP}$) or long-pulse threshold ($T_{LP}$). For example, if the short-pulse threshold ($T_{SP}$) and the long-pulse threshold ($T_{LP}$) are 10 seconds and 30 seconds, respectively, then time intervals may be 10 seconds and 30 seconds, respectively. The time intervals, m, at which the current parameters ($C_m$) are measured may correspond a time period previous to the duration of current event ($t_n$), time $t_{n-m}$=n-m to t=n. For example, if the duration of the current event is 40 seconds, ($t_{40}$), and the short-pulse threshold ($T_{SP}$) is 10 seconds, then one of the time intervals at which the current parameters ($C_m$) are measured may include 10 seconds. The time frequencies, n, at which the current parameters ($C_m$) are measured may be $t_{30}$ (i.e., $t_{n-10}$=40s–10s), $t_{31}$, $t_{32}$ ... $t_{40}$ (i.e., t=n). Accordingly, the respective measured current parameters ($C_m$) may include $C_{30}$, $C_{31}$, $C_{32}$ ... and, $C_{40}$.

In an exemplary embodiment, a current RMS-value (RMS($C_m^2$)) may be based on the current parameter ($C_m$) for a time interval, m. Such a current RMS-value may be calculated by the following equation.

$$\text{RMS}(C_m^2) = \sqrt{\frac{1}{n}(C_{n-m}^2 + C_{n-(m-1)}^2 + C_{n-(m-2)}^2 \ldots + C_n^2)}$$

To determine the second result, the current RMS-value may be compared to a long-pulse RMS-value. The long-pulse RMS-value may be the square root of the mean of a plurality of long-pulse parameters ($C_{LP,m}$) corresponding to various time intervals of the duration of the current event ($t_n$). Unlike the one or more short-pulse parameters, the one or more long-pulse parameters ($C_{LP,m}$) may correspond to a time interval, m, not the duration of the current event, $t_n$. In embodiments, the long-pulse parameters, ($C_{LP,m}$) may correspond to a time interval, m, that is determined by the short-pulse threshold, $T_{SP}$. Long-pulse parameters ($C_{LP,m}$) may include current (e.g., amps), a rate of current, a C-rate, voltage, resistance, energy capacity, potential, or the like. In embodiments, long-pulse parameters ($C_{LP,m}$) may include a SOC and/or a temperature of one or more of the batteries.

The long-pulse parameters ($C_{LP,m}$) may correspond to past-recorded current parameters recorded when the duration of a current event ($t_n$) was greater than a long-pulse threshold ($T_{LP}$). In embodiments, the long-pulse parameters ($C_{LP,m}$) may correspond to past-recorded current parameters recorded for a time interval, m. For example, the long-pulse parameters ($C_{LP,m}$) may include recorded current parameter measurements for events when the battery module was operating longer than the long-pulse threshold ($T_{LP}$). When the battery module operates for longer than a long-pulse threshold ($T_{LP}$) then current parameter measurements taken at a set time interval, m, may be recorded. The long-pulse parameters ($C_{LP,m}$) and corresponding measurements may be recorded to use for future calculations of the second result. In this manner, the maximum current parameter ($C_{MAX}$) determined via method 300 may be based on actual, dynamic data corresponding to the battery module.

The long-pulse parameters ($C_{LP,m}$) may be stored on one or more long-pulse tables. Corresponding battery operation data, such as temperature, SOC, and duration, may also be stored on the long-pulse table corresponding to a duration of a past current event ($t_n$) that was greater than a short-pulse threshold ($T_{SP}$). When a current parameter ($C_m$) for a battery module is recorded for a duration longer than the short-pulse threshold ($T_{SP}$), then the duration ($t_n$), a temperature of the battery module (or each of the individual batteries within the battery module), and a state-of-charge (SOC) for the battery module (or each of the individual batteries within the battery module), may be recorded corresponding to the recorded current parameter on the long-pulse table. On a long-pulse table, for each long-pulse parameter ($C_{LP,m}$) (e.g., the recorded current parameter within a long-pulse time period), there may be a corresponding duration, C-rate, temperature, and SOC for the battery module, or in embodiments, for each of the batteries within the battery module. It should be noted that the recorded current parameter for a short-pulse parameter or a long-pulse parameter ($C_{SP,n}$ or $C_{LP,m}$, respectively) may be different than a current parameter ($C_m$). The current parameter ($C_m$) may correspond to live measurements of the battery module, while recorded current parameters, such as $C_{SP,n}$ or $C_{LP,m}$, may correspond to past-recorded measurements of the battery module. In embodiments, the live measurements of the current parameter ($C_m$), and associated operation data, may be recorded and used in further iterations of method 300 as recorded current parameters, like $C_{SP,n}$ or $C_{LP,m}$.

The plurality of long-pulse parameters ($C_{LP,m}$) used to calculate the long-pulse RMS-value may be identified based on the operation data of a battery module during the time interval, m. For example, if the battery module has a temperature of 65° F., a SOC of 85%, and has been operating for a duration of 40 seconds ($t_{40}$) with a time interval, m, set to be 10 seconds based on the short-pulse threshold, $T_{SP}$, then a long-pulse parameter ($C_{LP,m}$) may be identified on the long-pulse table corresponding battery operations at a temperature of 65° F. with a SOC of 85% for each time frequency, n, between $t_{31}$ and $t_{40}$. Such identified long-pulse parameters may be denoted as $C_{LP,31}$, $C_{LP,32}$, $C_{LP,33}$, $C_{LP,34}$, etc. In embodiments, if there is no long-pulse parameter ($C_{LP,m}$) for the exact battery operations on the long-pulse table, then a long-pulse parameter ($C_{LP,m}$) for correlating battery operations may be identified. For example, if the battery operations includes a temperature of 70° F. but on the long-pulse table there are only long-pulse parameters ($C_{LP,m}$) for 65° F. and 75° F., then interpolation methods may be used to determine a long-pulse parameter ($C_{LP,m}$). In some embodiments, only the duration of the current event may be used to identify a long-pulse parameter ($C_{LP,m}$), while in others only the temperature or SOC may be used to identify the long-pulse parameter ($C_{LP,m}$). In this manner, the second result determined by method 300 may be based on actual, dynamic data corresponding to the battery module operations.

In embodiments, the long-pulse RMS-value (RMS($C_{LP,m}^2$)) based a time interval, m, for a duration of a current event ($t_n$) may be calculated by the following equation.

$$\text{RMS}(C_{LP,m}^2) = \sqrt{\frac{1}{n}(C_{LP,n-m}^2 + C_{LP,n-(m-1)}^2 + C_{LP,n-(m-2)}^2 \ldots + C_{LP,n}^2)}$$

Based on the second result determined at block 360, a maximum current parameter ($C_{MAX}$) based on either a short-pulse parameter ($C_{SP,n}$) or a current transition between the short-pulse parameter ($C_{SP,n}$) and a long-pulse parameter ($C_{LP,m}$) may be determine. If the second result indicates that the current RMS-value (RMS($C_m^2$)) is less than the long-pulse RMS-value (RMS($C_{LP,m}^2$)), then method 300 may continue to block 370 via a NO branch. If the second result indicates that the current RMS-value (RMS($C_m^2$)) is greater than the long-pulse RMS-value (RMS($C_{LP,m}^2$)), then method 300 may continue to block 380 via a YES branch.

At block 370, a maximum current parameter ($C_{MAX}$) may be determined based on one or more short-pulse parameters ($C_{SP,n}$). Similar to block 340, at block 370, a short-pulse parameter ($C_{SP,n}$) may be identified from one or more short-pulse tables corresponding to operation data of a battery module. In embodiments, more than one short-pulse parameter ($C_{SP,n}$) may be used to determine the maximum current parameter ($C_{MAX}$). If battery operation continues after a maximum current parameter ($C_{MAX}$) is determined, such as at block 370, then method 300 may return to block 320 and continue to determine a duration of current event, $t_n$.

At block 380, the maximum current parameter ($C_{MAX}$) may include a transition between a short-pulse parameter ($C_{SP,n}$) and a long-pulse parameter ($C_{LP,m}$). In some embodiments, the second result determined at block 360 may indicate that the current RMS-value (RMS($C_m^2$)) greater than the long-pulse RMS-value (RMS($C_{LP,m}^2$)). Accordingly, method 300 may transition the maximum current parameter ($C_{MAX}$) from a short-pulse parameter ($C_{SP,n}$) to a long-pulse parameter ($C_{LP,m}$). In embodiments, the current transition between the short-pulse parameter ($C_{SP,n}$) and the long-pulse parameter ($C_{LP,m}$) may be exponential, logarithmic, or linear. For example, if the short-pulse parameter ($C_{SP,n}$) is 5 C-rate and the long-pulse parameter ($C_{LP,m}$) is 3 C-rate, then a determined maximum current parameter ($C_{MAX}$) may include an exponential transition from 5 C-rate to 3 C-rate. In embodiments, one or more short-pulse parameters ($C_{SP,n}$) and/or one or more long-pulse parameters ($C_{LP,m}$) may be used to determine the maximum current parameter ($C_{MAX}$).

Figure 4:
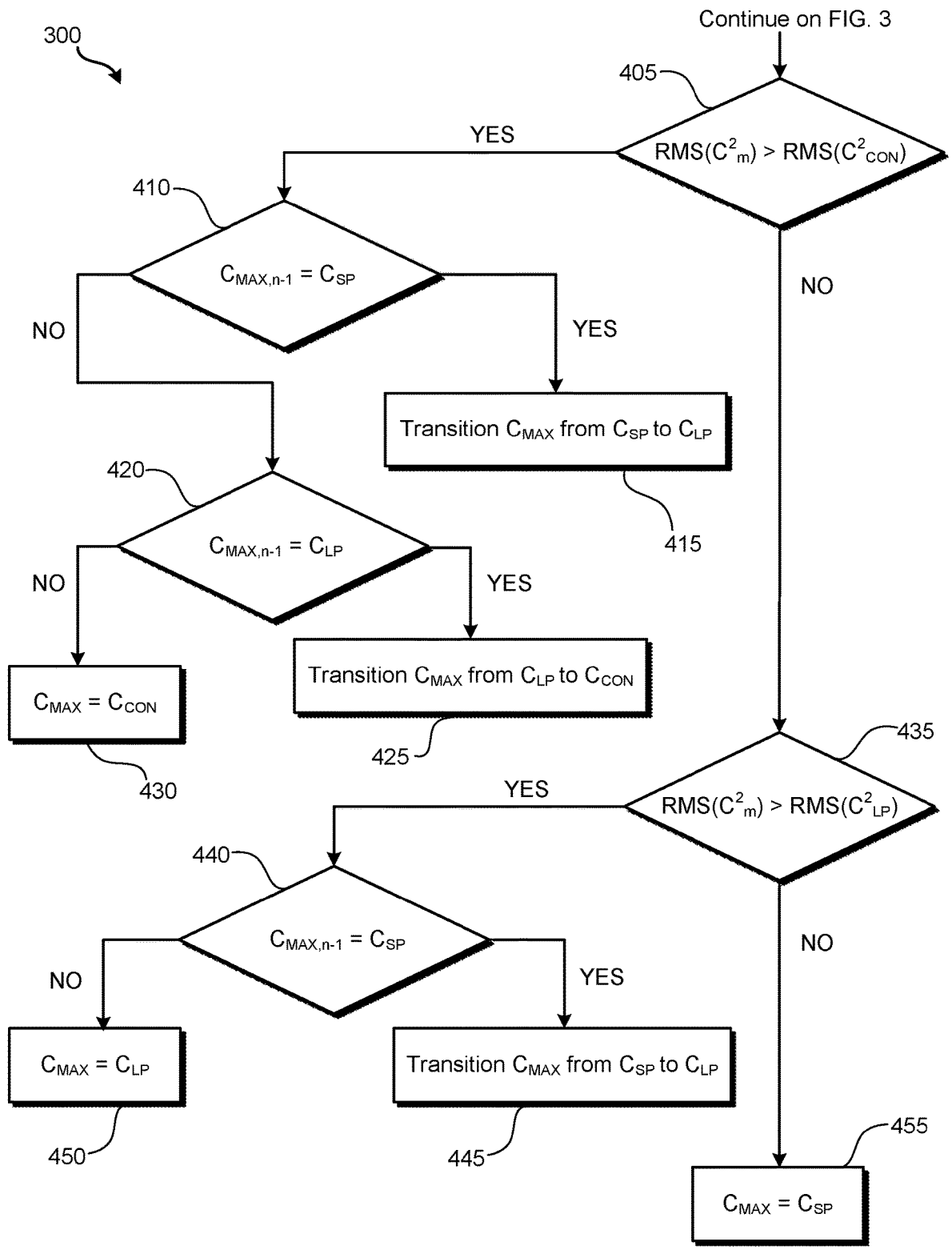
FIG. 4 illustrates a continuous of the method for controlling a maximum current threshold of a battery system within a vehicle of FIG. 3 according to an embodiment as disclosed herein.

Returning now to block 350, if the first result indications that the duration of time, n, is greater than the long-pulse threshold ($T_{LP}$), then method 300 may continue via the YES branch to block 405 illustrated on FIG. 4. The rest of the discussion relating to method 300 will continue with reference to FIG. 4.

At blocks 405 and 435, a third result may be determined. The third result may indicate whether a current RMS-value based ($RMS(C_m^2)$) is greater than a long-pulse RMS-value ($RMS(C_{LP,m}^2)$) or greater than a continuous RMS-value ($RMS(CC_{CON,m}^2)$). At block 405, a determination of whether a current RMS-value ($RMS(C_m^2)$) is greater than a continuous RMS-value ($RMS(C_{CON,m}^2)$) may be made. The current RMS-value ($RMS(C_m^2)$) determined at block 405 may be calculated using the equation and methods discussed above for time interval m. Similarly to the long-pulse RMS-value ($RMS(C_{LP,m}^2)$), the continuous RMS-value ($RMS(C_{CON,m}^2)$) may be the square root of the mean of a plurality of continuous parameters ($C_{CON,m}$) corresponding to a time interval, m, within the duration of the current event ($t_n$). In embodiments, the time interval m for the continuous parameter ($C_{CON,m}$) may correspond to the long-pulse threshold ($T_{LP}$). For example, if the long-pulse threshold ($T_{LP}$) is 30 seconds, then the time interval, m, used to calculate one or more continuous parameters may be 30 seconds. Thus, if the duration of the current event, $t_n$, is 60 seconds, then continuous parameters ($C_{CON,m}$) used to calculate the continuous RMS-value ($RMS(C_{CON,m}^2)$) may include $C_{CON,31}$, $C_{CON,32}$, $C_{CON,33}$ . . . and, $C_{CON,60}$.

In embodiments, continuous parameters ($C_{CON,m}$) may include current (e.g., amps), a rate of current, C-rate, voltage, resistance, energy capacity, potential, or the like. In embodiments, continuous parameters ($C_{CON,m}$) may also include SOC and/or temperature for one or more batteries within the battery system. The continuous parameters ($C_{CON,m}$) may correspond to past-recorded current parameters recorded during a time interval, m, when the duration of a current event ($t_n$) was greater than a continuous threshold ($T_{CON}$). For example, the continuous parameters ($C_{CON,m}$) may include recorded current parameter measurements for time intervals, m, when the battery module operates longer than the long-pulse threshold ($T_{LP}$). When the battery module operates for longer than a long-pulse threshold ($T_{LP}$), then current parameter measurements taken at various time frequencies, n, within a time interval, m, may be recorded. The continuous parameters ($C_{CON,m}$) and corresponding measurements may be recorded for future determinations of the third result. In this manner, the maximum current parameter ($C_{MAX}$) determined via method 300 may be based on actual, dynamic data corresponding to the battery module.

The continuous parameters ($C_{CON,m}$) may be stored on one or more continuous tables. Corresponding battery operation data, such as temperature, SOC, and duration, may also be stored on the continuous table corresponding to a duration of a past current event ($t_n$) that was greater than a long-pulse threshold ($T_{LP}$). When a current parameter ($C_m$) for a battery module is recorded for a duration longer than the long-pulse threshold ($T_{LP}$), then the duration ($t_n$), a temperature of the battery module (or each of the individual batteries within the battery module), and a state-of-charge (SOC) for the battery module (or each of the individual batteries within the battery module), may be recorded corresponding to the recorded current parameter on the continuous table. On a continuous table, for each continuous parameter ($C_{CON,m}$) (e.g., the recorded current parameter within a continuous time period), there may be a corresponding duration, C-rate, temperature, and SOC for the battery module, or in embodiments, for each of the batteries within the battery module. It should be noted that the recorded current parameter for a continuous parameter, such as continuous parameter ($C_{CON,m}$) may be different than a current parameter ($C_m$). The current parameter ($C_m$) may correspond to live measurements of the battery module, while recorded current parameters, such as $C_{CON,m}$, may correspond to past-recorded measurements of the battery module. In embodiments, the live measurements of the current parameter ($C_m$), and associated operation data, may be recorded and used in further iterations as recorded current parameters, like $C_{CON,m}$.

The plurality of continuous parameters ($C_{CON,m}$) used to calculate the continuous RMS-value may be identified based on the operation data of a battery module within an interval of time, m, for a duration of the current event ($t_n$). For example, if the battery module has a temperature of 65° F., a SOC of 85%, and has been operating for a duration of 55 seconds ($t_{55}$) and has a time interval, m, based on the long-pulse threshold of 30 seconds, then one or more continuous parameters ($C_{CON,m}$) may be identified on the continuous table relating to corresponding battery operations at a temperature of 65° F. with a SOC of 85% for a time interval, m, between $t_{26}$ and $t_{55}$. Such identified continuous parameters may be denoted as $C_{CON,26}$, $C_{CON,27}$, $C_{CON,28}$, $C_{CON,29}$, . . . to $C_{CON,55}$. In embodiments, if there is no continuous parameter ($C_{CON,m}$) for the exact battery operations on the continuous table, then a continuous parameter ($C_{CON,m}$) for correlating battery operations may be identified. For example, if the battery operations includes a temperature of 85° F. but on the continuous table there are only continuous parameters ($C_{CON,m}$) for 70° F. and 90° F., then extrapolation or interpolation methods may be used to determine a continuous parameter ($C_{CON,m}$). In some embodiments, only a duration of current event may be used to identify a continuous parameter ($C_{CON,m}$), while in others only the temperature or SOC may be used to identify the continuous parameter ($C_{CON,m}$). In this manner, the third result determined by method 300 may be based on actual, dynamic data corresponding to the battery module operations.

In embodiments, the continuous RMS-value ($RMS(C_{CON,m}^2)$) based on time interval, m, within a duration of a current event ($t_n$) may be calculated by the following equation.

$$RMS(C_{CON,m}^2) = \sqrt{\frac{1}{n}(C_{CON,n-m}^2 + C_{CON,n-(m-1)}^2 + C_{CON,n-(m-2)}^2 + \ldots + C_{CON,n}^2)}$$

Based on the third result determined at block 405, method 300 may either follow a YES branch to block 410 or follow a NO branch to block 435. If the third result indicates that the current RMS-value ($RMS(C_m^2)$) is less than the continuous RMS-value ($RMS(C_{CON,m}^2)$), then method 300 may continue to block 435 via a NO branch. If the second result indicates that the current RMS-value ($RMS(C_m^2)$) is greater than the continuous RMS-value ($RMS(C_{CON,m}^2)$), then method 300 may continue to block 410 via a YES branch.

At block 410, method 300 may determine whether a previous maximum current parameter at a duration of a current event at time n−1 ($C_{MAX,n-1}$) was based on one or more short-pulse parameters ($C_{SP,n}$). The previous maximum current parameter ($C_{MAX,n-1}$) may be a maximum current parameter based on one or more short-pulse parameters ($C_{SP,n}$), long-pulse parameter ($C_{LP,m}$), or continuous parameter ($C_{CON,m}$). For example, at block 410, method 300 may determine whether a previous maximum current parameter ($C_{MAX,n-1}$) was determined based on one or more short-pulse parameters ($C_{SP,n}$) at time n−1. If at block 410, it is determined that the previous maximum current parameter ($C_{MAX,n-1}$) was determined based on a short-pulse parameter ($C_{SP,n}$), then method 300 may follow a YES branch to block 415. However, if at block 410 it is determined that the previous maximum current parameter ($C_{MAX,n-1}$) was not determined based on a short-pulse parameter ($C_{SP,n}$), then method 300 may follow a NO branch to block 420.

At block 415, the maximum current parameter ($C_{MAX}$) may include a transition between a short-pulse parameter ($C_{SP,n}$) and a long-pulse parameter ($C_{LP,m}$). In some embodiments, it may be determined at block 410 that the previous maximum current parameter ($C_{MAX,n-1}$) at the duration of time n−1 was determined based on a short-pulse parameter ($C_{SP,n}$). Accordingly, method 300 may transition a maximum current parameter ($C_{MAX}$) from a short-pulse parameter ($C_{SP,n}$) to a long-pulse parameter ($C_{LP,m}$). In embodiments, the current transition between the short-pulse parameter ($C_{SP,n}$) and the long-pulse parameter ($C_{LP,m}$) may be exponential, logarithmic, or linear. For example, if the short-pulse parameter ($C_{SP,n}$) is 5 C-rate and the long-pulse parameter ($C_{LP,m}$) is 3 C-rate, then a determined maximum current parameter ($C_{MAX}$) may include an exponential transition from 5 C-rate to 3 C-rate.

At block 420, method 300 may determine whether a previous maximum current parameter at a duration of a current event at time n−1 ($C_{MAX,n-1}$) was based on one or more long-pulse parameters ($C_{LP,m}$). The previous maximum current parameter ($C_{MAX,n-1}$) may be a maximum current parameter based on one or more short-pulse parameters ($C_{SP,n}$), long-pulse parameters ($C_{LP,m}$), or continuous parameters ($C_{CON,m}$). For example, at block 420, method 300 may determine whether a previous maximum current parameter ($C_{MAX,n-1}$) was determined based on one or more long-pulse parameters ($C_{LP,m}$) corresponding to a time interval, m, at time n−1. If at block 420, it is determined that the previous maximum current parameter ($C_{MAX,n-1}$) was determined based on a long-pulse parameter ($C_{LP,m}$), then method 300 may follow a YES branch to block 425. However, if at block 420 it is determined that the previous maximum current parameter ($C_{MAX,n-1}$) was not determined based on a long-pulse parameter ($C_{LP,m}$), then method 300 may follow a NO branch to block 430.

At block 430, a maximum current parameter ($C_{MAX}$) may be determined based on one or more continuous parameter ($C_{CON,m}$). Similar to block 340 and block 370, a continuous parameter ($C_{CON,m}$) may be identified from one or more continuous tables corresponding to operation data of a battery module. At block 425, the maximum current parameter ($C_{MAX}$) may include a transition between a long-pulse parameter ($C_{LP,m}$) and a continuous parameter ($C_{CON,m}$). In some embodiments, it may be determined at block 420 that the previous maximum current parameter ($C_{MAX,n-1}$) at the duration of time n−1 was determined based on a long-pulse parameter ($C_{LP,m}$). Accordingly, method 300 may transition a maximum current parameter ($C_{MAX}$) from a long-pulse parameter ($C_{LP,m}$) to a continuous parameter ($C_{CON,m}$). In embodiments, the current transition between the long-pulse parameter ($C_{LP,m}$) and the continuous parameter ($C_{CON,m}$) may be exponential, logarithmic, or linear. For example, if the long-pulse parameter ($C_{LP,m}$) is 5 C-rate and the continuous parameter ($C_{CON,m}$) is 3 C-rate, then a determined maximum current parameter may include an exponential transition from 5 C-rate to 3 C-rate.

As noted above, if the third result indicates that the current RMS-value ($RMS(C_m^2)$) is less than the continuous RMS-value ($RMS(C_{CON,m}^2)$), then method 300 may continue to block 435 via a NO branch. In embodiments, a portion of the third result may be determined at block 435. Specifically, it may be determined whether a current RMS-value ($RMS(C_m^2)$) is greater than a long-pulse RMS-value ($RMS(C_{LP,m}^2)$). The current RMS-value ($RMS(C_m^2)$) and the long-pulse RMS-value ($RMS(C_{LP,m}^2)$) may be determined based on the equations and methods discussed above. If the third result at block 435 indicates that the current RMS-value ($RMS(C_m^2)$) is greater than a long-pulse RMS-value ($RMS(C_{LP,m}^2)$), then method 300 may follow a YES branch to block 440. If the third result at block 435 indicates the current RMS-value ($RMS(C_m^2)$) is less than a long-pulse RMS-value ($RMS(C_{LP,m}^2)$), then method 300 may follow a NO branch to block 455.

At block 440, method 300 may determine whether a previous maximum current parameter at a duration of a current event at time n−1 ($C_{MAX,n-1}$) was based on a short-pulse parameter ($C_{SP,n-1}$). The previous maximum current parameter ($C_{MAX,n-1}$) may be a maximum current parameter based on one or more short-pulse parameters ($C_{SP,n-1}$) at time n−1. For example, at block 440, method 300 may determine whether a previous maximum current parameter ($C_{MAX,n-1}$) was determined based on a short-pulse parameter ($C_{SP,n-1}$). If at block 440 it is determined that the previous maximum current parameter ($C_{MAX,n-1}$) was determined based on a short-pulse parameter ($C_{SP,n-1}$), then method 300 may follow a YES branch to block 445. However, if at block 440 it is determined that the previous maximum current parameter ($C_{MAX,n-1}$) was not determined based on a short-pulse parameter ($C_{SP,n-1}$), then method 300 may follow a NO branch to block 450.

At block 450, a maximum current parameter ($C_{MAX}$) may be determined based on a long-pulse parameter ($C_{LP,m}$). Similar to block 430, a long-pulse parameter ($C_{LP,m}$) may be identified from one or more long-pulse tables corresponding to operation data of a battery module. At block 445, the maximum current parameter ($C_{MAX}$) may include a transition between one or more short-pulse parameter ($C_{SP,n}$) and one or more long-pulse parameter ($C_{LP,m}$). In embodiments, a current transition of a maximum current parameter ($C_{MAX}$) may be from a short-pulse parameter ($C_{SP,n}$) to a long-pulse parameter ($C_{LP,m}$). In embodiments, the current transition between the short-pulse parameter ($C_{SP,n}$) and the long-pulse parameter ($C_{LP,m}$) may be exponential, logarithmic, or linear.

As noted above, if the third result at block 435 indicates that the current RMS-value ($RMS(C_m^2)$) is less than a long-pulse RMS-value ($RMS(C_{LP,m}^2)$), then method 300 may follow a NO branch to block 455. At block 455, a maximum current parameter ($C_{MAX}$) may be determined based on one or more short-pulse parameter ($C_{SP,n}$). Similar to block 370, a short-pulse parameter ($C_{SP,n}$) may be identified from one or more short-pulse tables corresponding to operation data of a battery module to determine the maximum current parameter ($C_{MAX}$).

When method 300 determines a maximum current parameter ($C_{MAX}$) via any of the decision paths discussed above, one or more vehicle systems powered by the battery module or one or more batteries within the battery module, may be controlled such that the battery module, or batteries, do not exceed the maximum current parameter ($C_{MAX}$). For example, the one or more vehicle systems may include a motor. Once method 300 determines a maximum current parameter ($C_{MAX}$) for a battery module, the motor may be controlled such that it does not request and/or draw more current from the battery module than the maximum current parameter ($C_{MAX}$). Accordingly, method 300 may determine a maximum current parameter ($C_{MAX}$) and control one or more vehicle systems based on the maximum current parameter ($C_{MAX}$).

In embodiments, any of the discussed parameters (e.g., $C_m$, $C_{SP,n}$, $C_{LP,m}$, etc.) may reflect the battery configuration. For example, these parameters may reflect how many battery modules are within the battery system, whether the batteries and/or battery modules are in series or in parallel, and how the batteries and/or battery modules are connected.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for controlling a maximum current threshold of a battery system within a vehicle, the system comprising:
   a battery module comprising one or more batteries;
   one or more vehicle systems;
   a battery management system comprising a battery monitoring unit that monitors a current parameter of the battery module; and
   a battery control system, comprising one or more processors, that receives the current parameter from the battery monitoring unit, wherein the battery control system is configured to:
   identify a current event for the battery module,
   determine a duration of the current event,
   compare the duration of the current event to a plurality of time thresholds,
   determine the current parameter based on the duration of the current event,
   determine a maximum current parameter based on the duration of the current event and the current parameter, and
   control the one or more vehicle systems such that a current of the one or more batteries does not exceed the maximum current parameter;
   wherein comparing the duration of the current event to the plurality of time thresholds comprises:
     comparing the duration of the current event to a short-pulse threshold; and
     in response to the duration of the current event being greater than the short-pulse threshold, comparing the duration of the current event to a long-pulse threshold to determine a first result;
   wherein determining the maximum current parameter based on the duration of the current event and the current parameter comprises:
     determining the maximum current parameter based on the first result and the current parameter.

2. The system for controlling the maximum current threshold of the battery system within the vehicle of claim 1, wherein the battery control system is further configured to:
   compare the maximum current parameter to a previous maximum current parameter;
   determine a current transition based on the maximum current parameter and the previous maximum current parameter; and
   control the one or more vehicle systems based on the current transition.

3. The system for controlling the maximum current threshold of the battery system within the vehicle of claim 2, wherein the battery control system controls the one or more vehicle systems such to vary the current of the one or more batteries based on the current transition.

4. The system for controlling the maximum current threshold of the battery system within the vehicle of claim 1, wherein the first result indicates that the duration of the current event is less than the long-pulse threshold, and based on the first result the battery control system is configured to:
   calculate a current Root-Mean-Square (RMS)-value based on the current parameter;
   compare the current RMS-value to a long-pulse RMS-value to determine a second result; and
   determine based on the second result the maximum current parameter based on either a short-pulse parameter or a current transition between the short-pulse parameter and a long-pulse parameter.

5. The system for controlling the maximum current threshold of the battery system within the vehicle of claim 1, wherein the first result indicates that the duration of the current event is greater than the long-pulse threshold, and based on the first result the battery control system is configured to:

calculate a current Root-Mean-Square (RMS)-value based on the current parameter;
compare the current RMS-value to a long-pulse RMS-value and a continuous RMS-value to determine a third result; and
determine, based on the third result the maximum current parameter based on at least one of a short-pulse parameter, a long-pulse parameter, or a continuous parameter.

6. A method for controlling current of a battery management system, the method comprising:
identifying a current event for a battery module comprising one or more batteries;
determining a duration of the current event;
comparing the duration of the current event to a plurality of time thresholds;
measuring a current parameter based on the duration of the current event;
determining a maximum current parameter based on the duration of the current event and the current parameter; and
controlling vehicle systems such that a current of the one or more batteries does not exceed the maximum current parameter;
wherein comparing the duration of the current event to the plurality of time thresholds comprises:
comparing the duration of the current event to a short-pulse threshold; and
in response to the duration of the current event being greater than the short-pulse threshold, comparing the duration of the current event to a long-pulse threshold to determine a first result;
wherein determining the maximum current parameter based on the duration of the current event and the current parameter comprises:
determining the maximum current parameter based on the first result and the current parameter.

7. The method for controlling current of the battery management system of claim 6, the method further comprising:
comparing the maximum current parameter to a previous maximum current parameter; and
determining a current transition based on the maximum current parameter and the previous maximum current parameter.

8. The method for controlling current of the battery management system of claim 6, wherein the first result indicates that the duration of the current event is less than the long-pulse threshold, and based on the first result the method further comprises:
calculating a current Root-Mean-Square (RMS)-value based on the current parameter;
comparing the current RMS-value to a long-pulse RMS-value to determine a second result; and
determining based on the second result the maximum current parameter based on either a short-pulse parameter or a current transition between the short-pulse parameter and a long-pulse parameter.

9. The method for controlling current of the battery management system of claim 6, wherein the first result indicates that the duration of the current event is greater than the long-pulse threshold, and based on the first result the method further comprises:
calculating a current Root-Mean-Square (RMS)-value based on the current parameter;
comparing the current RMS-value to a long-pulse RMS-value and a continuous RMS-value; and
determining a third result.

10. The method for controlling current of the battery management system of claim 9, wherein the third result indicates that the current RMS-value is greater than the continuous RMS-value, and based on the third result determining the maximum current parameter based on a continuous parameter.

11. The method for controlling current of the battery management system of claim 9, wherein the third result indicates that the current RMS-value is greater than the long-pulse RMS-value, and based on the third result determining the maximum current parameter based on a long-pulse parameter.

12. The method for controlling current of the battery management system of claim 9, wherein the third result indicates that the current RMS-value is less than the long-pulse RMS-value, and based on the third result determining the maximum current parameter based on a short-pulse parameter.

13. The method for controlling current of the battery management system of claim 6, wherein determining the maximum current parameter is further based on one or more condition factors comprising a temperature and a state-of-charge for each of the one or more batteries.

14. A non-transitory processor-readable medium for determining a maximum current parameter for a battery module comprising processor-readable instructions configured to cause one or more processors to:
identify a current event for a battery module comprising one or more batteries;
determine a duration of the current event;
compare the duration of the current event to a plurality of time thresholds;
determine a current parameter based on the duration of the current event;
determine a maximum current parameter based on the duration of the current event and the current parameter; and
control one or more vehicle systems such that a current of the one or more batteries does not exceed the maximum current parameter;
wherein comparing the duration of the current event to the plurality of time thresholds comprises:
comparing the duration of the current event to a short-pulse threshold; and
in response to the duration of the current event being greater than the short-pulse threshold, comparing the duration of the current event to a long-pulse threshold to determine a first result;
wherein determining the maximum current parameter based on the duration of the current event and the current parameter comprises:
determining the maximum current parameter based on the first result and the current parameter.

15. The non-transitory processor-readable medium for determining the maximum current parameter for the battery module of claim 14, wherein the processor-readable instructions are further configured to cause the one or more processors to:
compare the maximum current parameter to a previous maximum current parameter;
determine a current transition based on the maximum current parameter and the previous maximum current parameter; and
control the one or more vehicle systems such to vary the current of the one or more batteries based on the current transition.

16. The non-transitory processor-readable medium for determining the maximum current parameter for the battery module of claim 14, wherein the maximum current parameter is determined based at least one of a short-pulse parameter, a long-pulse parameter, or a continuous parameter.

* * * * *